Patented Oct. 17, 1939

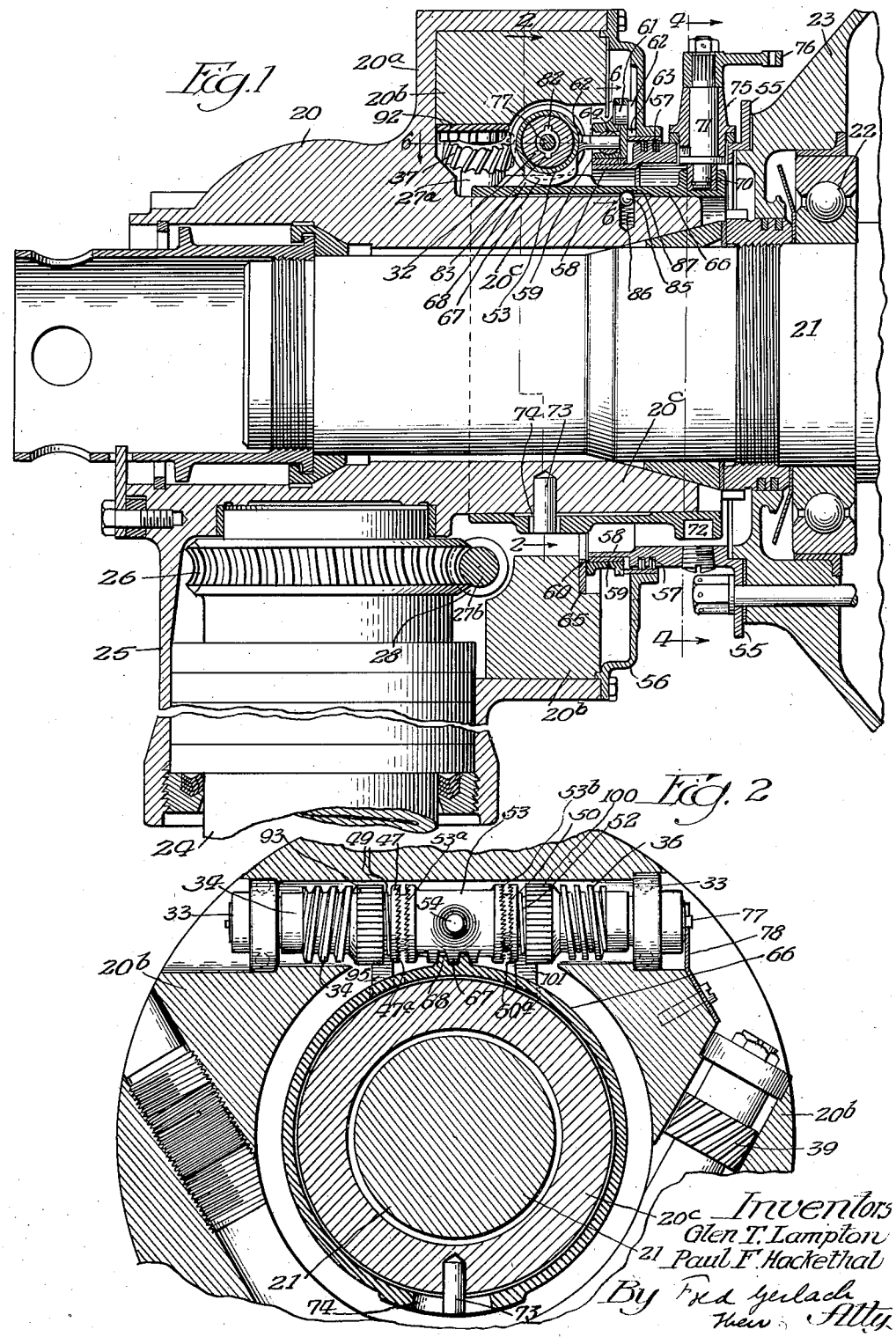

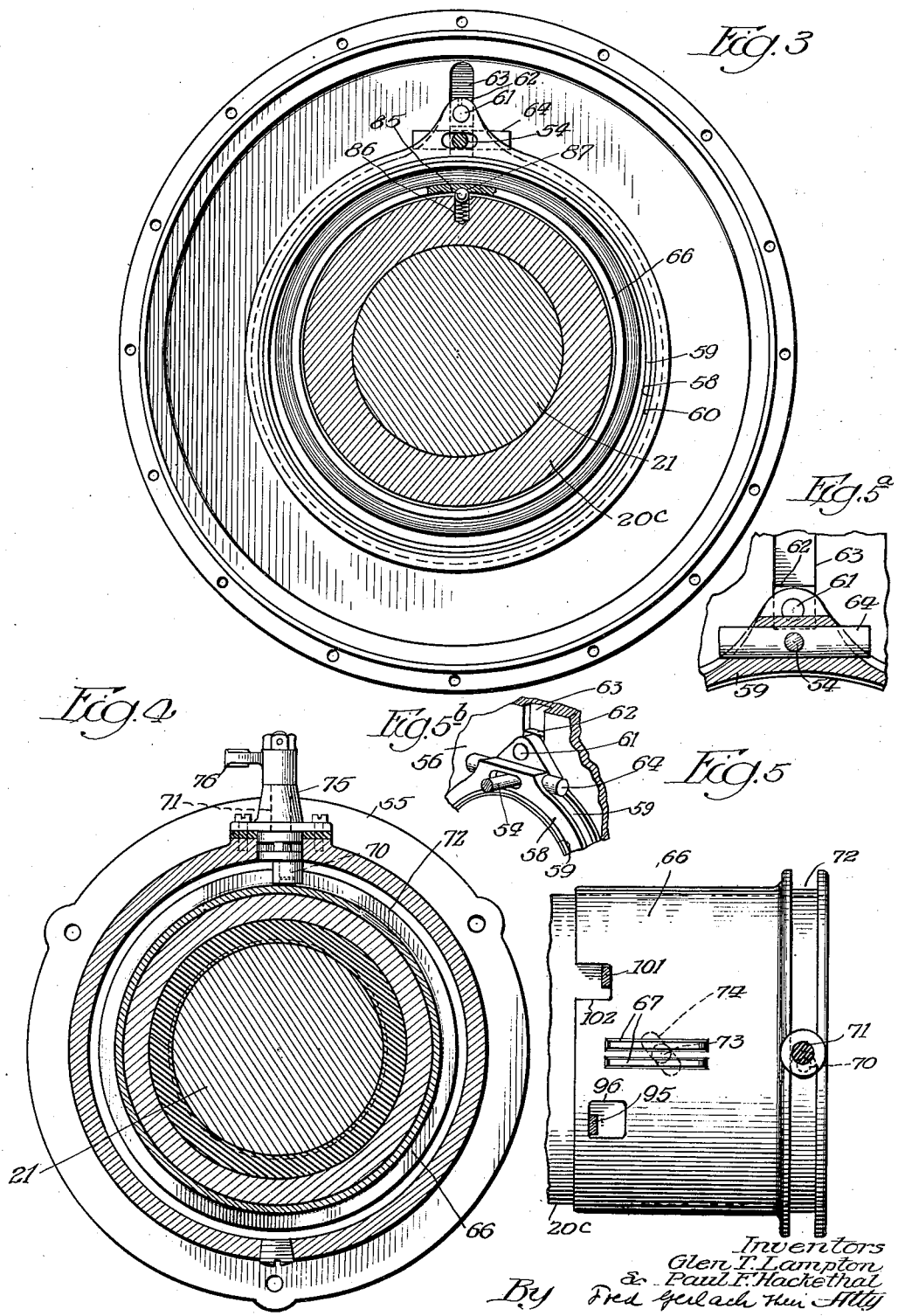

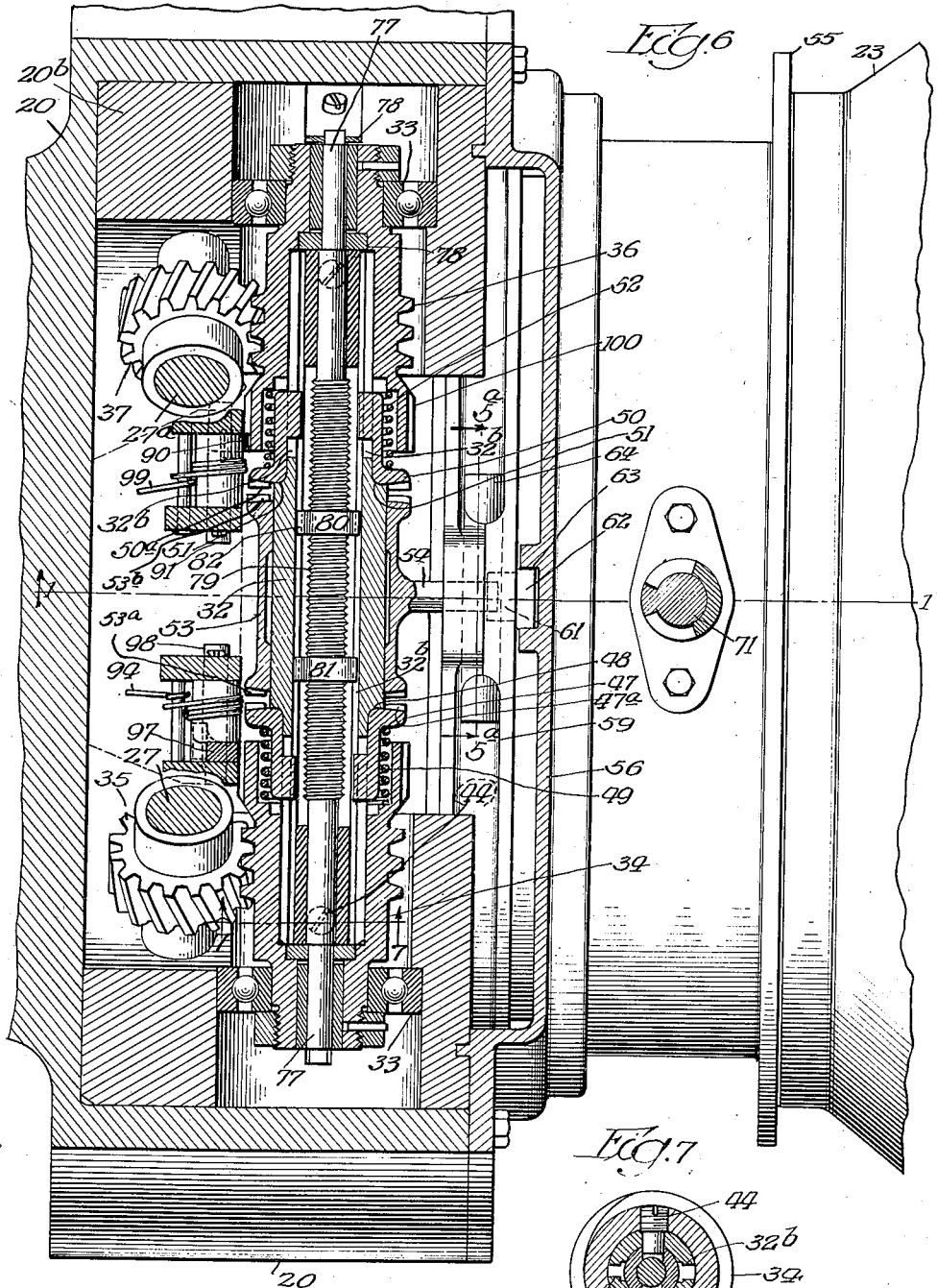

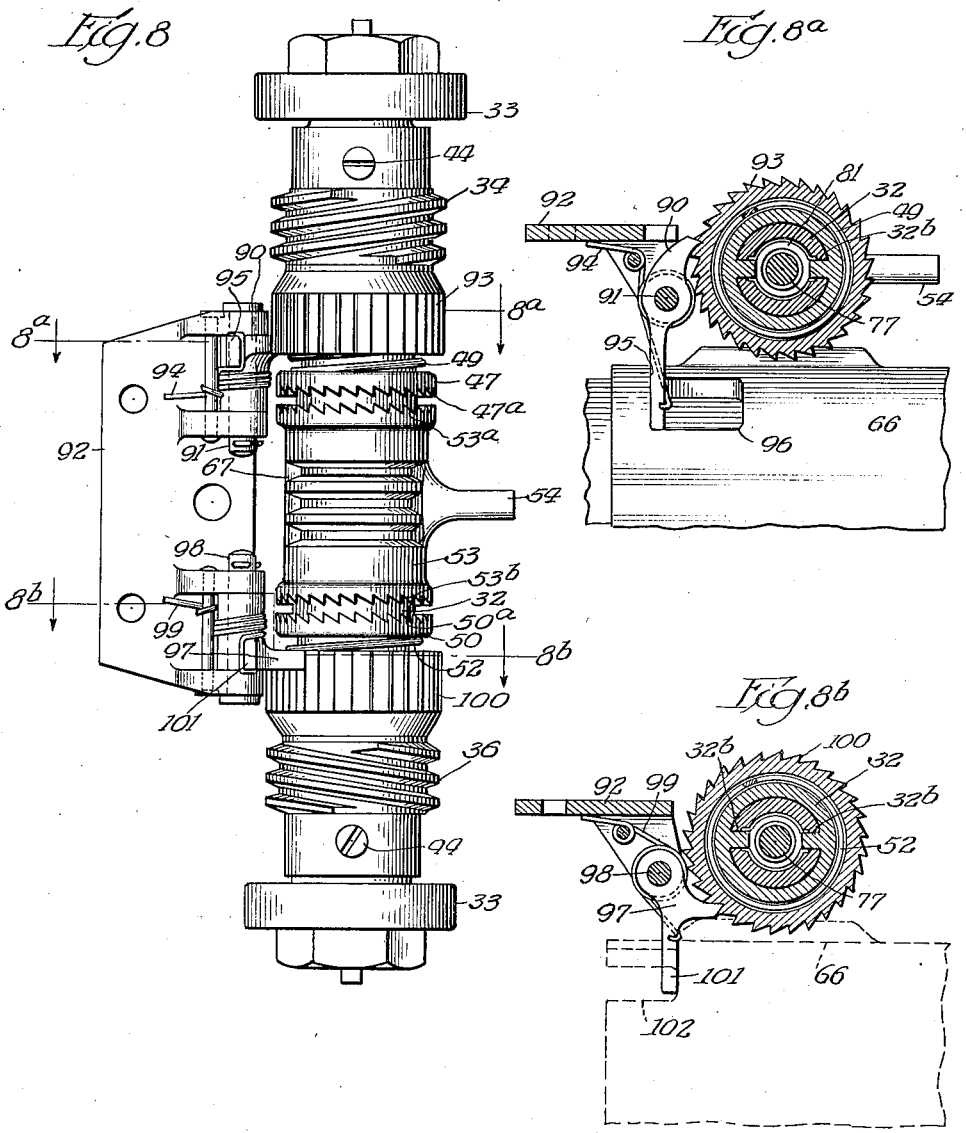

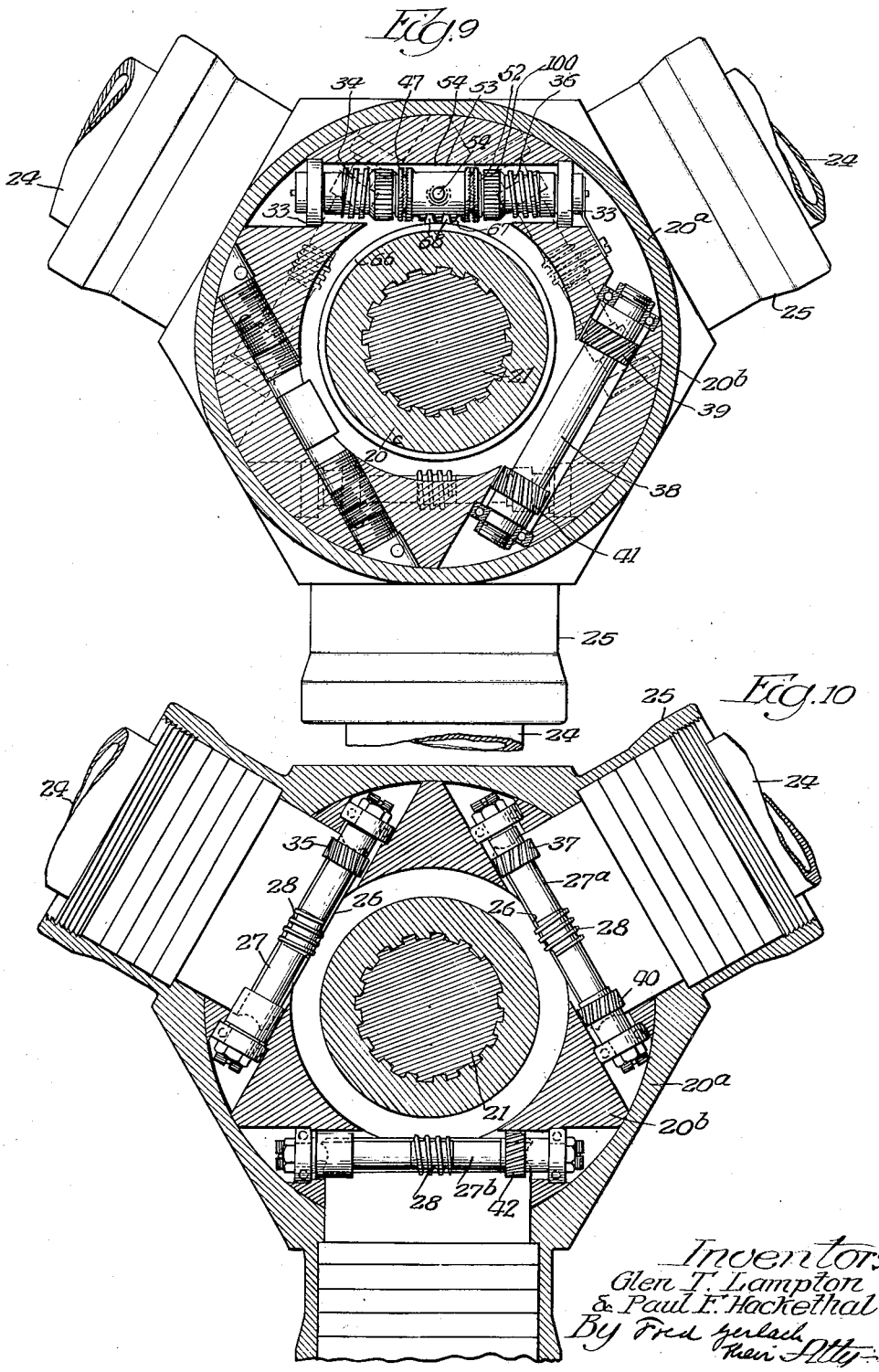

2,176,556

UNITED STATES PATENT OFFICE 2,176,556

CONTROLLABLE PITCH PROPELLER

Glen T. Lampton and Paul F. Hackethal, Williamsport, Pa., assignors to Aviation Manufacturing Corporation, Williamsport, Pa., a corporation of Delaware Application February 12, 1936, Serial No. 63,520

25 Claims. (Cl. 170—163)

The invention relates to controllable pitch-propellers.

One object of the invention is to provide an improved selectively controlled mechanism for operating the pitch-change gearing in which combined gear-tooth pressure and friction from rubbing velocity in the engageable and disengageable elements for driving the pitch-change gearing will be avoided. This object is attained by utilizing clutch-wheels for operating the pitch-change gearing step-by-step, and by providing means, such as an eccentric and follower for operating the clutches, so that the rubbing due to the high velocity of the propeller is taken between the follower and the eccentric. By eliminating the combined gear-tooth pressure and the rubbing velocity in the selectively controlled elements for driving the pitch-change gearing, excessive wear is overcome and the counterbalances heretofore necessary to reduce gear-tooth pressure may be eliminated or greatly reduced.

Another object of the invention is to provide improved selectively controlled mechanism of the oscillatory or step-by-step type for operating the pitch-change gearing, in which clutch-wheels having coacting annular series of one-way teeth are provided so that the operating force is distributed throughout the entire series of teeth on the clutch-wheels.

Another object is to provide mechanism of the intermittent or ratchet type with means for preventing backlash in the gearing.

Another object of the invention is to provide a construction in which the clutches heretofore used only for automatically uncoupling the gearing at the end of predetermined pitch-limits, are also utilized in driving the pitch-change gearing step-by-step.

Other objects of the invention will appear from the detailed description.

The invention consists in the several novel features which are hereinafter set forth and are more particularly defined by claims at the conclusion hereof.

In the drawings:

Fig. 1 is a longitudinal section of a propeller embodying the invention; Fig. 2 is a section on line 2—2 of Fig. 1; Fig. 3 is a front view of the eccentric on the non-rotative ring and the eccentric-ring or follower which is fitted around the eccentric and is carried by the hub; Fig. 4 is a section on line 4—4 of Fig. 1; Fig. 5 is a detail of the collar for controlling the pitch-change mechanism to render it operative or inoperative; Fig. 5ᵃ is a section on line 5ᵃ—5ᵃ of Fig. 6; Fig. 5ᵇ is a detail of the eccentric-follower or ring and its connections to the driving member of the clutch and to the cover-plate; Fig. 6 is a section on line 6—6 of Fig. 1; Fig. 7 is a section on line 7—7 of Fig. 6; Fig. 8 is an inverted plan of the clutch-mechanism for operating the pitch-change gearing; Fig. 8ᵃ is a section on line 8ᵃ—8ᵃ of Fig. 8; Fig. 8ᵇ is a section on line 8ᵇ—8ᵇ of Fig. 8. Fig. 9 is a transverse section through the propeller-hub on a line intersecting the pitch-limit mechanism; Fig. 10 is a transverse section through the propeller-hub, illustrating the worm-shafts for rotating blades of a three-blade propeller.

The invention is exemplified in a propeller comprising a hub 20, which is fixed to the front end of the shaft 21, which is driven from the engine in any manner, as well understood in the art, and is journaled in a bearing 22 carried by the front of the stationary housing 23.

The invention is exemplified in a propeller having three blades 24, each suitably journaled for rotation on its own axis in a tubular extension 25 of the hub 20. The shank of each propeller has affixed thereto a worm-gear 26. The pitch-change gearing comprises a series of three transversely arranged shafts 27, 27ᵃ, 27ᵇ, each of which is journaled in a block 20ᵇ which is removably carried in the hub 20. Each of said transverse shafts is provided with a worm 28 for engaging one of the worm-gears 26 on one of the blades. A hollow transversely extending shaft 32 has affixed thereto, adjacent one of its ends, a worm 34, which meshes with a gear 35 on shaft 27. Adjacent its other end, shaft 32 has affixed thereto a worm 36, which meshes with a gear 37 on the shaft 27ᵃ. A transversely extending shaft 38 has affixed thereto a gear 39 which meshes with a gear 40 on shaft 27ᵃ and a gear 41 which meshes with a gear 42 on shaft 27ᵇ, to drive shaft 27ᵇ from shaft 27ᵃ. All of these transverse shafts are mounted in bearings 33 carried in cylindrical block 20ᵇ which is secured within a flange 20ᵃ of the hub, and rotate bodily with the hub. This mechanism constitutes gearing for simultaneously and equally rotating, from shaft 32, the blades on their own axes for pitch increase or decrease. Worm-wheels 34 and 36 are fixedly secured by screws 44 to the hollow shaft 32. The hubs of said worms are journalled in bearings 33 in the cylindrical block 20ᵇ, and the ends of shaft 32 terminate in said hubs.

A clutch-wheel 47 is slidable and rotatable with the hollow shaft 32 and is normally held against a shoulder 48 on the shaft by a coil-spring 49 between worm 34 and said wheel. A second clutch-wheel 50 is rotatable with shaft 32 and is normally seated against a shoulder 51 on the shaft by a spring 52 between worm 36 and said wheel. Each of the clutch-wheels 47, 50 is provided with splines which are slidable in longitudinal slots 32$^b$ in shaft 32, so that rotation of either wheel will rotate said shaft. Clutch-wheels 47 and 50 are each provided on one of their faces with positively-acting radial one-way or ratchet-teeth 47$^a$ and 50$^a$, respectively. These teeth are adapted for rotation of the clutch-wheels in opposite directions. A clutch-sleeve 53 is rotatable and slidable on the shaft 32 between the clutch-wheels 47, 50 and is provided at its opposite ends with radial one-way or ratchet-teeth 53$^a$, 53$^b$, which are adapted to engage and coact with the teeth on said wheels to rotate the shaft 32, step-by-step, in opposite directions. When the sleeve 53 is shifted axially on the shaft 52 in one direction to cause its teeth 53$^a$ to engage the teeth on the spring-pressed clutch-wheel 47, oscillation of the sleeve will rotate the clutch-wheel 47, the shaft 32 and the worms 34 and 36 carried thereby, step-by-step in one direction. Axial shift of the sleeve 53 in the opposite direction will bring its teeth 53$^b$ into engagement with the spring-pressed clutch-wheel 50, and oscillation of the sleeve will rotate the clutch-wheel 50, the shaft 32 and said worms 34, 36 in the opposite direction. During oscillation, the sleeve 53 will be held against axial movement on the shaft and the clutch-wheels will be rotated step-by-step. The springs applied to the wheels 47, 50 permit them to move axially so the ratchet-teeth on the clutch-wheels can slip past the teeth on the sleeve which is held against axial movement during the return strokes of the sleeve. The one-way ratchet-teeth of the driving members or wheels on the sleeve 53 and on the clutch-wheels 47, 50 are formed on their contiguous faces so that during the operative stroke of the sleeves, the entire series of teeth will engage, and the load will be distributed throughout the entire series of teeth, as contradistinguished from the action of a pawl-and-ratchet.

An arm or pin 54 integral with, and extending rearwardly from, sleeve 53 is adapted to impart oscillatory movement to the sleeve. A ring 55 is fixedly secured to the housing 23 and extends forwardly into a rear cover-plate 56 which is fixed to the rear side of the hub 20. Oil-rings 57 in the ring 55 engage the cover to retain lubricant in the hub. The forward end of ring 56 is provided with a hollow eccentric 58 which extends around the inner portion 20$^c$ of the hub 20. An eccentric follower 59 fits around the eccentric 58 and is provided with a wear-band or bronze sleeve 60. The follower 59 carries a pin 61 which is pivotally held therein and is provided with a square stud 62 which is radially slidable in a groove 63 in the cover-plate 56 which rotates with the hub 20. A transverse pin 64 is journaled and longitudinally slidable in the follower 59. The arm 54 of the sleeve 53 is slidably fitted in a hole extending diametrically through pin 64. When the propeller is revolving, the stud 62 will be carried around with the hub and cover-plate 56 to cause the eccentric follower 59 to be moved radially by the non-rotative eccentric 58. The follower is free to pivot on the pin 61 and the guide-block 62, which carries said pin, slides in the groove 63 in the cover-plate 56. The pin 64, which can pivot in the follower 59 and the sliding connection between arm 54 and pin 64, constitute a universal joint connection for oscillating the sleeve 53 by power derived from the rotation of the follower with the hub around the non-rotative eccentric 58. Plates 65, secured to the block 20$^a$, hold the follower against axial movement on the eccentric 58. Pin 64 is slidable in the follower to permit the sleeve 53 to be shifted axially in coupling it to, and uncoupling it from, either of the clutch-wheels 47, 50.

The mechanism for selectively shifting the clutch-sleeve 53 to operate the clutch-wheels 47, 50, respectively, comprises a collar 66, which is rotatable and slidable on the portion 20$^c$ of the hub, and is provided with elongated ribs or teeth 67 into which extend segmental teeth 68 on the central portion of the clutch-sleeve 53. Rotation of the collar 66 will shift the sleeve 53 in one direction or the other to cause the clutch-teeth on said sleeve to engage the teeth on either of the clutch-wheels 47, 50. An eccentric-stud 70 on the lower end of a shaft 71, extends into an annular groove 72 on the collar 66 to shift the collar longitudinally of the propeller-shaft. A stud 73, fixed in the hub-portion 20$^c$, extends into an oblique slot 74 in the collar 66. Shaft 71 is mounted in a bearing 75 fixed to stationary ring 55 and an arm 76 fixed to the upper end of shaft 71 is adapted to rotate the eccentric stud 70 to move the collar 66 longitudinally. Arm 76 is connected in any suitable manner to a suitable operating element accessible to the pilot and when it is shifted it will swing the eccentric-pin 70 to move the collar 66 longitudinally and, when such longitudinal movement occurs, the oblique slot 74 will cause the collar 66 to be rotated to shift the clutch-sleeve 53 into engagement with either of the clutch-wheels 47, 50, according to the direction in which the arm 76 is shifted. Sleeve 53 will also be axially shifted. Eccentric stud 70 on shaft 71 is movable between dead-center positions, so that when the stud is in position to engage the sleeve with either of the clutch-wheels, the collar 66 will be locked in such position to keep the sleeve coupled to the wheels.

A ball-detent 85 is pressed by a spring 86 into a V-shaped notch 87 in the inner periphery of the control-collar 66. This notch is located to yieldingly hold the collar in its neutral position and its pressure is such that it will drive the sleeve with the propeller-shaft and take care of the inertia forces involved while the engine is accelerating or decelerating. The sliding and pivotal connection between the eccentric-follower 59 and the cover-plate 56 formed by the pin 61, which is pivoted in the follower and the block 62 which slides in the cover-plate 56, constitutes a driving connection between the hub and the follower, which, in connection with the collar 66 which is held by spring-detent 85, prevents engagement of the clutches during acceleration or deceleration of the propeller.

A screw-shaft 77 extends through the hollow shaft 32 and is held against rotation by a retainer 78, which is fixed to the block 20$^b$ in the hub. A screw 79 is formed on the shaft 77 to which a pair of nuts 80, 81 are threaded. These nuts are each provided with ribs 82, which extend into slots 32$^b$ in the hollow shaft 32, to cause the nuts to rotate with said shaft. Nut 80 is adapted to engage the splines on the clutch-wheel 50 to shift it axially against the force of spring 49 and move the clutch-teeth thereon out of the path of the clutch-teeth 48 on the contiguous end of sleeve 53 when the sleeve is set into position to operate said clutch-wheel. Nut 81 is also provided with similar ribs guided in slots 32ᵇ in shaft 32 to engage the splines on clutch-wheel 47 to similarly disengage it from the other end of the clutch-sleeve 53. This mechanism controls the operation of the pitch-change gearing to automatically limit the pitch-changes. When the blades are being rotated by the pitch-change gearing to increase their pitch, the nut 81 will disengage the clutch-wheel 47 from the sleeve 53 when the high pitch-limit has been reached. Similarly, the other nut 81 will engage the other clutch-wheel 50 to disengage it from the clutch-sleeve when the blades reach the low pitch-limit. This exemplifies means for automatically disengaging the clutches through which the pitch-change gearing is operated from te oscillating clutch-sleeve to limit the pitch-changes.

When the clutch-sleeve 53 is uncoupled from clutch-wheels 47, 49, particularly during the operation of the gearing to increase the pitch of the blades, there is accumulated back pressure and strain in the gear train of sufficient magnitude to retract the gear train during the retractile strokes of the clutch-sleeve 53 and the invention provides ratchet or latching mechanism for preventing retraction of the gear train at all times. This mechanism comprises a dog 90 which is pivoted at 91 to a plate 92 which is secured in the block 20ᵇ in the hub 20. This dog is adapted to engage an annular series of ratchet teeth 93 which are formed on a projecting hub or worm 34. A spring 94 is applied to dog 90 to hold it normally into engagement with teeth 93. A tail or extension 95 on dog 90 extends into a slot 96 formed in the shifter-collar 66. Axial movement of the collar 66 in one direction results from the engagement of helical slot 74 and pin 73 when the collar is shifted inwardly to render the clutch-sleeve 53 operative. When the extension 95 of dog 90 is shifted axially by one end of slot 96, the dog will be held disengaged from the ratchet teeth 93 and this will release the clutch-wheel 47 while the clutch-sleeve is in coacting relation with the clutch-wheel 50 to permit the clutch-wheel 47 to rotate backwardly. A dog 97 is pivoted at 98 to plate 92 and a spring 99 is applied to said dog to press it into engagement with a series of ratchet teeth 100 on the hub of clutch-wheel 50. This dog 97 has an extension or arm 101, which extends into a notch 102 in collar 66 so that when the collar is shifted outwardly to engage clutch-sleeve 53 and clutch-wheel 47, the inner end of said slot in the sleeve will disengage dog 97 from teeth 100 and permit the clutch-wheel 50 to rotate reversely. The dog which engages the ratchet teeth on the clutch-wheel which is coupled to the sleeve 53 is left in engagement with the ratchet teeth on said wheel to prevent any backlash or reverse movement of the gear train. These pawls operate on ratchet teeth which are formed on the worms 34, 36 to prevent the friction of the pawl-load from being applied to resist the axial motion of the clutch-wheels required for ratcheting. When the collar 66 and clutch-sleeve 53 are in neutral position dogs 90, 97 will engage ratchet teeth 93, 100 respectively and lock worms 34, 36 against rotation in either direction.

The operation will be as follows: Normally, the clutch-sleeve 53 will be held in its neutral position (Fig. 6) by detent 85, so that the sleeve will be uncoupled from, and will be ineffective to rotate, either of the clutch-wheels 47, 50. When a pitch-change is desired, the pilot will shift the arm 76 in one direction. This will cause the eccentric pin 70 on shaft 71 to shift the collar 66 longitudinally, and hold it in position to couple the sleeve 53 to one of the clutch-wheels 47, 50. The pin 73 and slot 74 will cause the collar 66 to rotate and slide. Rotation of the collar will, through the connection 67, 68 between the collar and clutch-sleeve 53, shift said sleeve to couple it to one of the clutch-wheels 47, 50, according to the direction of shift of the arm 66 and whether an increase or decrease of pitch is desired. The non-rotative eccentric 58 will operate the follower 59, so that the head 62 of pin 61 will slide radially in the groove 63 in the cover-plate 56, which rotates with the hub 20. Pin 64 will be shifted radially with the follower and oscillate the arm 54 on the sleeve 53. While the propeller is revolving, the sleeve 53 will be constantly operated by the eccentric and eccentric-follower. While the sleeve is coupled to one of the clutch-wheels 47, 50, it will be held against axial movement on the shaft 32 by the gear connection 68, 67 with the collar 66. During the strokes of the sleeve 53 in one direction, the one-way or ratchet-teeth on the sleeve and the clutch-wheel with which it is coupled, will rotate the clutch-wheel step-by-step and, during the retractile strokes, the coacting one-way ratchet-teeth on the sleeve and wheel will slip past one another, the springs applied to the clutch-wheels permitting the clutch-wheels to move axially for this purpose. When the sleeve 53 is shifted to its neutral position, it will be uncoupled from the engaged clutch-wheel and the pitch-change gearing will stop. When the sleeve is reversely shifted to couple it to the other clutch-wheel, a reverse pitch-change will occur in the same manner.

During the operation of each of the clutch-wheels 47, 50, the dog associated with the worm to which the clutch-wheel is coupled, will be effective to prevent reverse rotation and simultaneously the dog associated with the other uncoupled clutch-wheel will be disengaged from its associated ratchet-teeth to release the latter clutch-wheel and its associated worm associated for rotation. These dogs are shifted in this manner by the collar 66 which renders the clutch-sleeve 53 selectively operable to drive the pitch-change gearing in either direction. If the pilot fails to shift the sleeve 53 to its neutral position at predetermined high or low pitch-limits, the nuts 80, 81 will automatically uncouple the clutch-wheels 47, 50 from the clutch-sleeve 53 to discontinue the operation of the pitch-change gearing and limit the pitch-changes.

The invention exemplifies a construction in which the gear-tooth pressure and the rubbing velocity are not combined in a gear-connection for operating the clutch-sleeve and the rubbing occurs between the eccentric and the eccentric-follower. This avoids excessive gear-tooth wear and makes it possible to eliminate or reduce the counterbalances which have been found necessary in constructions in which the gear-tooth pressure and rubbing velocity were combined in stationary and rotatable gears.

The invention also exemplifies a controllable pitch-propeller, in which the pitch-change gearing is operated in opposite directions through a pair of positively acting clutch-wheels which are selectively operable from the oscillating clutch-sleeve and in which the automatic pitch-limit control is effected by uncoupling the same clutches.

The invention also exemplifies a construction in which the pitch-change gearing is operated step-by-step by clutch-wheels and an oscillating sleeve or element, which are provided with series of teeth which simultaneously engage during the operative strokes.

The invention is not to be understood as restricted to the details set forth, since these may be modified within the scope of the appended claims, without departing from the spirit and scope of the invention.

Having thus described the invention, what we claim as new and desire to secure by Letters Patent is:

1. In a controllable pitch-propeller, the combination of a propeller-shaft, a hub on the shaft, blades rotatable in the hub for pitch-variation, pitch-change gearing carried by the hub, a pair of one-way clutches carried by the hub adapted to drive the gearing in opposite directions, respectively, each comprising a driven member and a driving member, means for oscillating the driving members of the clutches to intermittently rotate either of the driven members, and means for automatically uncoupling the clutches at the end of predetermined pitch-limits.

2. In a controllable pitch-propeller, the combination of a propeller-shaft, a hub on the shaft, blades rotatable in the hub for pitch-variation, pitch-change gearing carried by the hub, a pair of one-way clutches carried by the hub adapted to drive the gearing in opposite directions, respectively, each comprising a driven member and a driving member, means for oscillating the driving members of the clutches to intermittently rotate either of the driven members, means for automatically uncoupling the clutches at the end of predetermined pitch-limits, and means for selectively coupling the clutches.

3. In a controllable pitch-propeller, the combination of a propeller-shaft, a hub on the shaft, blades rotatable in the hub for pitch-variation, pitch-change gearing carried by the hub, a pair of one-way clutches carried by the hub adapted to intermittently drive the gearing in opposite directions, respectively, each comprising a driven member and a driving member, and means for oscillating the driving members of the clutches to rotate the driven members, comprising an eccentric constantly fixed against rotation and an eccentric follower-ring extending around the eccentric and mounted in, and to rotate with, the hub.

4. In a controllable pitch-propeller, the combination of a propeller-shaft, a hub on the shaft, blades rotatable in the hub for pitch-variation, pitch-change gearing carried by the hub, clutches carried by the hub and adapted to drive the gearing in opposite directions, respectively, each comprising a driving member and a driven member, said members being coaxial and provided with confronting faces having coacting ratchet-teeth engageable and disengageable by axial movement of one of the members relatively to the other, means for oscillating the driving members and thereby intermittently rotate the driven members, respectively, and means for selectively coupling either of the clutches to drive the gearing.

5. In a controllable pitch-propeller, the combination of a propeller-shaft, a hub on the shaft, blades rotatable in the hub for pitch-variations, pitch-change gearing carried by the hub, clutches carried by the hub on axes extending transversely of the propeller shaft and connected to drive the gearing in opposite directions, respectively, each comprising a driving and a driven wheel provided with coacting ratchet-teeth engageable and disengageable by relative axial movement of one of the wheels with respect to the other, means for oscillating the driving wheels and thereby intermittently rotate the driven wheels, respectively, and means for selectively coupling either of the clutches to drive the gearing.

6. In a controllable pitch-propeller, the combination of a propeller-shaft, a hub on the shaft, blades rotatable in the hub for pitch-variation, pitch-change gearing carried by the hub, clutches carried by the hub and connected to drive the gearing in opposite directions, respectively, each comprising a driving member and a driven member provided on their contiguous faces with a series of coacting ratchet-teeth engageable and disengageable by relative axial movement, means for oscillating the driving members and thereby intermittently rotate the driven members, respectively, and means for selectively coupling either of the clutches to drive the gearing.

7. In a controllable pitch-propeller, the combination of a propeller-shaft, a hub on the shaft, blades rotatable in the hub for pitch-variation, pitch-change gearing carried by the hub, clutches mounted in the hub and adapted to drive the gearing in opposite directions, respectively, each comprising a pair of driving and driven wheels provided wtih co-acting ratchet-teeth engageable and disengageable by relative axial movement, means for selectively coupling either one or the other of the pairs of wheels and means for oscillating the driving wheels and thereby intermittently rotate the driven wheels, respectively.

8. In a controllable pitch-propeller, the combination of a propeller-shaft, a hub on the shaft, blades rotatable in the hub for pitch-variation, pitch-change gearing carried by the hub, clutches carried by the hub connected to drive the gearing in opposite directions, respectively, each comprising a driving and a driven member provided with coacting ratchet-teeth engageable and disengageable by axial movement of one of the members relatively to the other, means for oscillating the driving members and thereby intermittently rotate the driven members respectively, spring-means for permitting relative axial movement of the members during movement of the driving members in one direction, and means for selectively coupling either of the clutches to drive the gearing.

9. In a controllable pitch-propeller, the combination of a propeller-shaft, a hub on the shaft, blades rotatable in the hub for pitch-variation, pitch-change gearing carried by the hub, a transversely extending shaft mounted in the hub, clutches on the transverse shaft adapted to drive the gearing in opposite directions, respectively, each comprising a driving member and a driven member provided with coacting ratchet-teeth engageable and disengageable by relative axial movement of one of the members on the shaft, means for oscillating the driving members to intermittently rotate either of the driven members, and means for selectively coupling either of the clutches to drive the gearing.

10. In a controllable pitch-propeller, the combination of a propeller-shaft, a hub on the shaft, blades rotatable in the hub for pitch-variation, pitch-change gearing carried by the hub, a transversely extending shaft mounted in the hub, clutch-wheels on the transverse shaft adapted to drive the gearing in opposite directions, respectively, a sleeve on the shaft provided with coacting ratchet-teeth for engaging the wheels and axially movable into driving relation with either of the clutch-wheels, means for oscillating the driving wheels, and means for selectively coupling the sleeve with either of the clutch-wheels to drive the gearing.

11. In a controllable pitch-propeller, the combination of a propeller-shaft, a hub on the shaft, blades rotatable in the hub for pitch-variation, pitch-change gearing carried by the hub, one-way clutch-members adapted to drive the gearing in opposite directions, respectively, a driving clutch-element intermediate and coaxial with said clutch-members, and provided wtih means engageable with either of the clutch-members, means for oscillating the driving element, and means for selectively coupling the driving element wtih either of the driven members to intermittently rotate the members respectively.

12. In a controllable pitch-propeller, the combination of a propeller-shaft, a hub on the shaft, blades rotatable in the hub for pitch-variation, pitch-change gearing carried by the hub, one-way clutch-members adapted to drive the gearing in opposite directions, respectively, an axially movable driving sleeve intermediate the clutch-members, and provided wtih means engageable with either of the clutch-members, means for oscillating the sleeve, and means for selectively shifting the sleeve to drive either of the clutch-members.

13. In a controllable pitch-propeller, the combination of a propeller-shaft, a hub on the shaft, blades rotatable in the hub for pitch-variation, pitch-change gearing carried by the hub, spring-pressed one-way clutch-members adapted to drive the gearing in opposite directions, respectively, an axially movable driving sleeve intermediate the clutch-members, and provided with means engageable with either of the clutch-members, means for oscillating the sleeve, and means for selectively shifting the sleeve to drive either of the clutch-members.

14. In a controllable pitch-propeller, the combination of a propeller-shaft, a hub on the shaft, blades rotatable in the hub for pitch-variation, pitch-change gearing carried by the hub, one-way clutches carried in the hub and adapted to drive the gearing in opposite directions, respectively, each comprising a driven member and a driving member, means for oscillating the driving members of the clutches to intermittently rotate either of the driven members, comprising a non-rotative eccentric around the propeller-shaft, and means for selectively coupling either of the clutches to drive the gearing.

15. In a controllable pitch-propeller, the combination of a propeller-shaft, a hub on the shaft, blades rotatable in the hub for pitch-variation, pitch-change gearing carried by the hub, one-way clutches carried in the hub and adapted to drive the gearing in opposite directions, respectively, each comprising a driven member and a driving member, means for oscillating the driving members of the clutches to intermittently rotate either of the driven members, comprising a non-rotative eccentric around the shaft, and an eccentric follower, and means for selectively coupling either of the clutches to drive the gearing.

16. In a controllable pitch-propeller, the combination of a propeller-shaft, a hub on the shaft, blades rotatable in the hub for pitch-variation, pitch-change gearing carried by the hub, one-way clutches carried in the hub and adapted to drive the gearing in opposite directions, respectively, each comprising a driven member and a driving member, means for oscillating the driving members of the clutches to rotate the driven members, comprising a non-rotative eccentric around the shaft, and an eccentric follower having a sliding pivotal connection with the hub arranged to oscillate the driving members and thereby intermittently rotate the driven members, and means for selectively coupling either of the clutches to drive the gearing.

17. In a controllable pitch-propeller, the combination of a propeller-shaft, a hub on the shaft, blades rotatable in the hub for pitch-variation, pitch-change gearing carried by the hub, one-way clutches carried in the hub and adapted to drive the gearing in opposite directions, respectively, each comprising a driven member and a driving member, means for oscillating the driving members of the clutches to rotate the driven members, comprising a non-rotative eccentric around the shaft, an eccentric follower, and a universal joint-connection between the follower and the driving members, and means for selectively coupling either of the clutches to drive the gearing.

18. In a controllable pitch-propeller, the combination of a propeller-shaft, a hub on the shaft, blades rotatable in the hub for pitch-variation, pitch-change gearing carried by the hub, one-way clutch-members carried in the hub and adapted to drive the gearing in opposite directions, respectively, a sleeve for operating the members, means for oscillating the sleeve to rotate the clutch-members, comprising a non-rotative eccentric around the shaft, an eccentric follower carried by the hub, and connected to oscillate the sleeve, and means for selectively coupling the sleeve to either of the clutch-members.

19. In a controllable pitch-propeller, the combination of a propeller-shaft, a hub on the shaft, blades rotatable in the hub for pitch-variation, pitch-change gearing carried by the hub, a pair of one-way clutches comprising oscillatory members adapted to drive the gearing in opposite directions, means for oscillating the members, means for selectively shifting the oscillatory members to couple and uncouple the clutches, comprising a rotatable collar in the hub and around the propeller-shaft and connected to shift the oscillatory members, and means for yieldingly holding the collar in its neutral position to rotate it during acceleration or deceleration of the propeller-shaft.

20. In a controllable pitch-propeller, the combination of a propeller-shaft, a hub on the shaft, blades rotatable in the hub for pitch-variation, pitch-change gearing carried by the hub, a pair of one-way clutches comprising oscillatory members adapted to drive the gearing in opposite directions, means for oscillating the members, means for selectively shifting the oscillatory members to couple and uncouple the clutches, comprising a rotatable collar in the hub and around the propeller-shaft and connected to shift the oscillatory members, and a spring-detent between the hub and the collar for retaining the collar in its neutral position and rotating it during acceleration and deceleration of the propeller-shaft.

21. In a controllable pitch propeller, the combination of a propeller shaft, a hub on the shaft, blades rotatable in the hub for pitch-variation, pitch-change gearing carried by the hub, one-way clutches carried in the hub adapted to drive the gearing in opposite directions respectively and comprising driving and driven elements, means for oscillating the driving elements to intermittently rotate the driven members, and latching means for preventing reverse rotation of the gearing during the oscillatory strokes in one direction of the driving elements, comprising elements which remain engaged during the intermittent rotation of the driven elements.

22. In a controllable pitch propeller, the combination of a propeller shaft, a hub on the shaft, blades rotatable in the hub for pitch-variation, pitch-change gearing carried by the hub, one-way clutches carried in the hub adapted to drive the gearing in opposite directions respectively and comprising driving and driven elements, means for oscillating the driving elements to intermittently rotate the driven members, means for selectively coupling and uncoupling the clutches, respectively, and latching means for preventing reverse rotation of the gearing while the clutches are uncoupled and during the oscillatory strokes in one direction of the driving elements, comprising elements and means for continuously pressing the elements into engagement during the intermittent rotation of the driven elements.

23. In a controllable pitch propeller, the combination of a propeller shaft, a hub on the shaft, blades rotatable in the hub for pitch-variation, pitch-change gearing carried by the hub, one-way clutches carried in the hub adapted to drive the gearing in opposite directions respectively and comprising driving and driven elements, means for oscillating the driving elements to intermittently rotate the driven elements, and latching means for preventing reverse rotation of the gearing during the oscillatory strokes in one direction comprising ratchet-wheels to which the driven elements are slidably connected to permit the driving and driven elements to remain in engagement during the operation of the driving elements and dogs adapted to constantly engage the ratchets during the intermittent rotation of the driven elements.

24. In a controllable pitch propeller, the combination of a propeller shaft, a hub on the shaft, blades rotatable in the hub for pitch-variation, pitch-change gearing carried by the hub, one-way clutches carried in the hub adapted to drive the gearing in opposite directions respectively and comprising driving and driven elements, means for oscillating the driving elements to intermittently rotate the driven elements, means for coupling the driving and driven elements, pawls and ratchets for preventing reverse rotation of the gearing during the oscillatory strokes of the driven elements in one direction, and means for alternately releasing the pawls conjointly with the coupling of the clutches.

25. A control means for a propeller having blades rotatable in pitch including blade operating gearing, right and left hand driving ratchet members, driven ratchets engageable with respective driving ratchets and drivably engaged with said gearing, oscillating lever means rigid with said driving ratchets, all said mechanism being rotatable with the propeller as a whole, an eccentric held from rotation, an eccentric strap operatively connecting said lever means to said eccentric and means to engage either the right hand or the left hand ratchets as desired.

GLEN T. LAMPTON.
PAUL F. HACKETHAL.